Dec. 5, 1967  L. D. PERRY  3,355,945
TAMPER-PROOF METER ENCLOSURE
Filed April 23, 1965  2 Sheets-Sheet 1
Fig. 1
Fig. 2
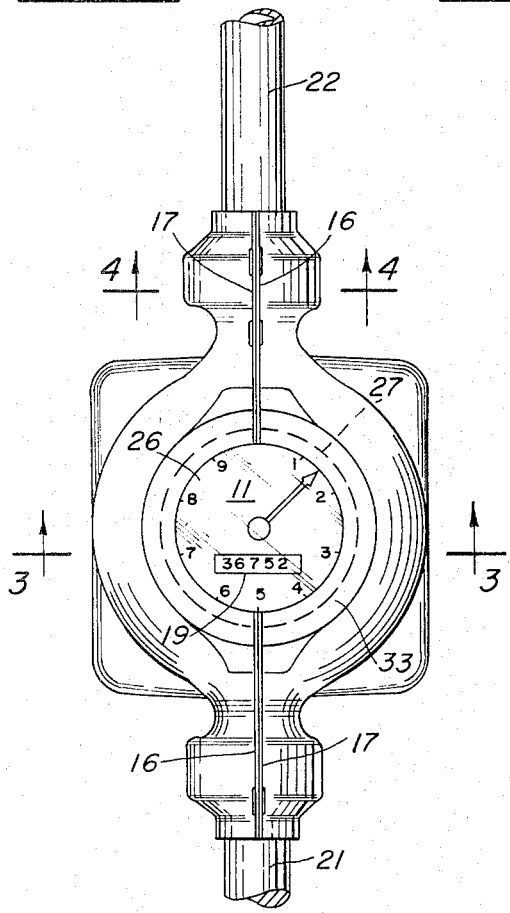
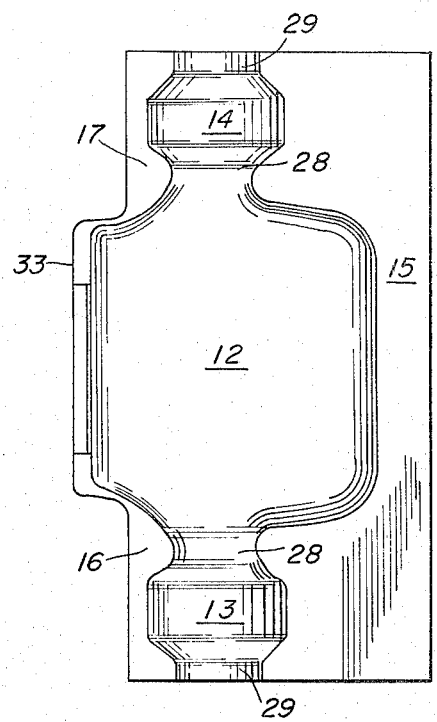
Fig. 3
Fig. 4
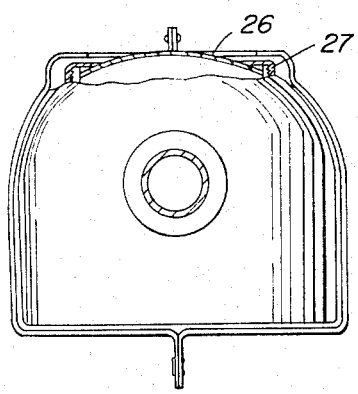
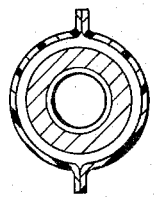
INVENTOR.
LEE D. PERRY
BY Rummler & Snow
Attys.

Dec. 5, 1967  L. D. PERRY  3,355,945
TAMPER-PROOF METER ENCLOSURE
Filed April 23, 1965   2 Sheets-Sheet 2
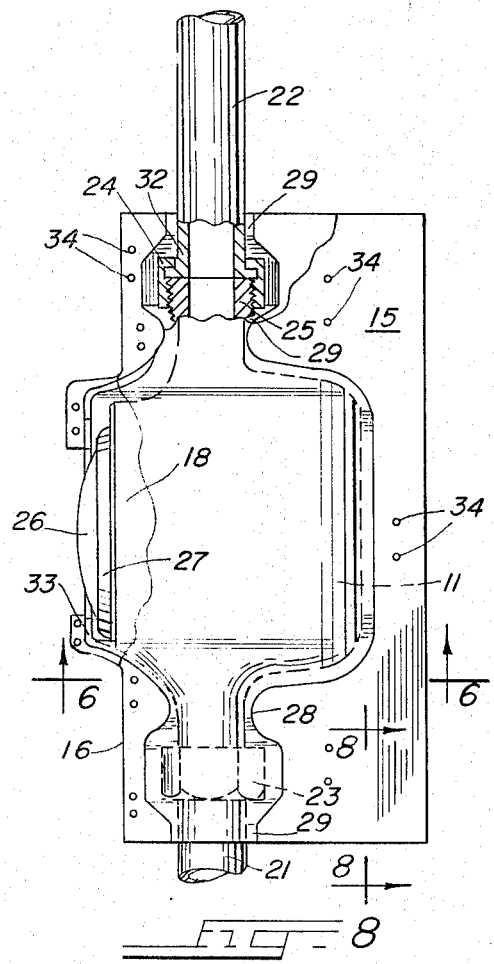
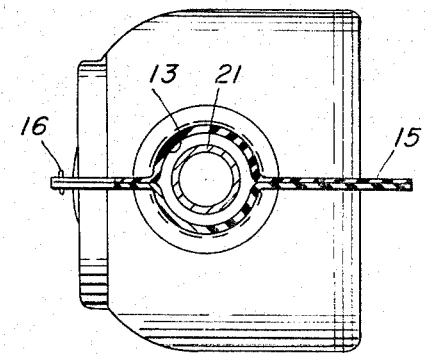
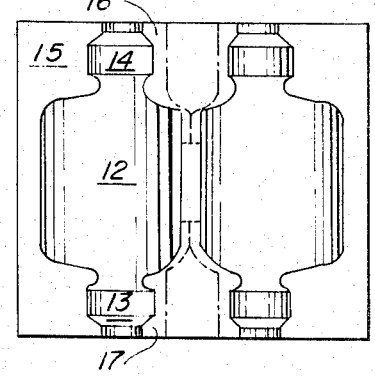
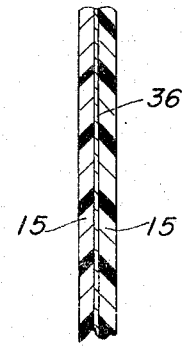
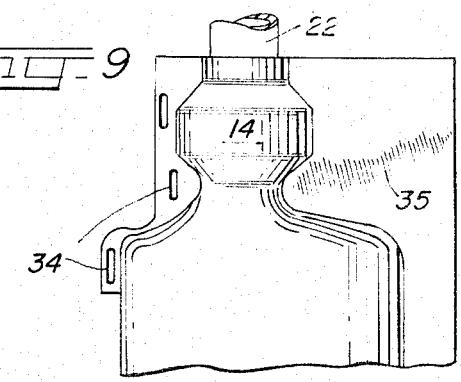
INVENTOR.
LEE D. PERRY
BY 3,355,945
TAMPER-PROOF METER ENCLOSURE
Lee D. Perry, Hoffman Estates, Ill., assignor to Robert B.
    Bishop Inc., Chicago, Ill., a corporation of Illinois
            Filed Apr. 23, 1965, Ser. No. 450,324
                    2 Claims. (Cl. 73—201)

ABSTRACT OF THE DISCLOSURE

A two-piece, tamper-proof, molded plastic enclosure, for recording meters connected in a fluid supply conduit, adapted to be mounted on a meter in situ to fully enclose the meter and the conduit connections therewith and to be permanently closed thereabout, the plastic material being of the type to reveal by discoloration any attempt to obtain access to the meter or the conduit connections therewith.

---

Community agencies, which supply metered fluids, especially water and gas, to homes, have been beset with the all-too-frequent reversal, removal, or recording dial tampering of the inlet service line meters, or tampering with by-pass or inlet valves, between the known periods of meter reading by a representative of the community agency. In the past, various facilities have been devised to avoid this practice. For one reason or another, however, none of the prior facilities have proven wholly successful.

The main objects of this invention, therefore, are to provide an improved enclosure for a flow control or measuring device, such as a recording meter or a by-pass valve, and the inlet and outlet conduit connections thereof to prevent undetectable tampering with the meter and/or its connections; to provide an improved form of enclosure means structured from a pair of half-section units adapted for permanent bonding together in embracive position on the meter to form a hollow-unitary body enclosing the meter and its conduit connections so as to frustrate any unauthorized attempts to obtain access to the meter and/or its connections; to provide an improved molded plastic enclosure of this kind which will permanently reveal by change of color any stress applied in attempt to open or remove the enclosure; and to provide a device of this kind of such simple form as to make very inexpensive its manufacture and exceedingly facile its mounting on a meter already installed in a supply line.

A specific embodiment of this invention is shown in the accompanying drawing in which:

FIGURE 1 is a top view of a conventional type of water meter and its inlet and outlet connections, all embraced by a shell-like enclosure consisting of a pair of molded half-section units constructed in accordance with this invention;

FIG. 2 is an elevational inner side view of one of the molded half-section units;

FIG. 3 is a transverse, sectional view taken on the plane of the line 3—3 of FIG. 1 but showing the meter in elevation with a portion of its upper part in section;

FIG. 4 is a cross-sectional detail taken on the plane of the line 4—4 of FIG. 1;

FIG. 5 is a side elevational view of a pair of the molded units, constructed in accordance with this invention, embracively arranged on a weter meter, portions being broken away to show certain parts of the meter and one of its service line connections.

FIG. 6 is an end elevation of the enclosed meter as viewed from the plane of the line 6—6 of FIG. 5;

FIG. 7 is a plan view of the two simultaneously-molded half-section units before their separation and as they would be made by a vacuum molding process;

FIG. 8 is an enlarged, cross-sectional detail taken on the plane of the line 8—8 of FIG. 5 to illustrate adhesive bonding of the two half-sections to form an enclosure shell; and FIG. 9 is a fragmentary, side view of the upper end of FIG. 5 with shading indicative of the "blush" or discoloration that inevitably is created in the plastic body material as a result of any stress or strain applied to the plastic incident in an attempt to tamper with the enclosed meter.

The essential concept of this invention is to provide a hollow, molded, shell-like enclosure for a valve or recording meter, comprising a pair of half-section units so formed and internally contoured as to substantially follow the external configuration of the enclosed body and its conduit couplings whereby said units when embracively positioned in face to face relation on the said body and bonded together, will seal-off all parts of the body and its conduit couplings against tampering with its installation or recording mechanism; and to form such enclosure of a material that will reveal, by a visible change of state, any attempt at unauthorized access to the meter.

A tamper-proof, molded-plastic unit, for use in forming an enclosure shell for a conventional fluid meter 11, and embodying the foregoing concept, comprises a main cavity 12 and a pair of auxiliary cavities 13 and 14 offset from the plane of a defining base flange 15 and a pair of oppositely-disposed supplemental flanges 16 and 17.

A conventional fluid meter 11, for use with which this two-unit, tamper-proof enclosure was initially conceived and constructed, is of the type generally used for the registering of water service to private dwellings. Such fluid meters, over the years, have been marketed in various shapes and sizes. However, they all involve a housing 18 enclosing the registering mechanism (not here shown) to activate a visible dial means 19. Such a meter 11 spans spaced ends of conduits 21 and 22 whereto the meter 11 is secured by coupling connections 23 and 24. As here shown the connections 23 and 24 are in the form of flanged and threaded collars (FIG. 5) swivelled on the flanged ends of the conduit sections 21 and 22 and threaded onto the opposite nipples 25 integrated with the meter housing 18. It is this residential type of water meter that so often is by-passed or reversed, temporarily, in the water line, by unscrupulous residents. The reversal or by-passing is effected shortly following one meter reading—by a company employee—and replaced shortly before the next reading, which reading periods have become known to the resident.

Whatever the structure of the meter the dial means 19 is made visible through a transparent cover 26 secured in position on the housing 18 by a bezel or retaining ring 27, here shown as screwed into the housing 18, as is apparent from FIG. 3.

The molded-plastic unit, as best shown by the inside face view of FIG. 2, has the main cavity 12, offset from the common plane of the flanges 15, 16 and 17 and contoured to closely embrace the one-half of the exterior of the meter 11, which projects from a plane which includes the axes of the meter and its connections, whatever its shape may be. The auxiliary cavities 13 and 14 (FIG. 2) here are shown of semicircular bordering ridges 28 and 29. The contour of the cavities 13 and 14 is such as to embrace the respective coupling connections 23 and 24, with the ridges 28 and 29 half-embracing the necks 31 of the respective nipples 25 integrated with the meter housing 18, and with the outermost ridge 29 embracing the adjacent end portions of the respective conduits 21 and 22 (FIG. 5).

The base flange 15 of such molded unit is of such axial length and transverse radial width as to extend outwardly of the meter 17 and the coupling connections 23 and 24 so as to permit face-to-face contact and bonding of the flanges entirely around the meter 17 and its conduit connections, except for the face of the window 26 over the dial means 19. Also the auxiliary flanges 16 and 17, with their opposite ends aligned with the axial ends of the main flange 15, extend radially outward from the cavities 13 and 14 and the upper perimeter of the main cavity 12 to produce sufficient areas of face to face engagement as to permit firm bonding outwardly of the connections 23 and 24. As shown these flanges 16 and 17 merge with and also project from an inwardly-extending rim 33 which embracively overlaps the bezel or retaining ring 27 (FIG. 5).

The material from which these units are molded, preferably, is a high-impact butadiene polystyrene. The preference, also, is for the white or near-white plastic. This type of plastic is used for the reason that it is very strong and has the characteristic of "blushing" or changing color when stressed, as in the present use by any unauthorized attempt to open or remove such an enclosure from a meter. If such stressing did not fracture the material, it would so "craze" it as to leave an irremovable mark in the plastic itself. Such mark or "blush" as it is often called, is indicated by the shading at 35 in FIG. 9.

The bonding together of a pair of these molded units in embracing relation with the meter to form the enclosing shell may be accomplished either by an appropriate adhesive, as indicated at 36 in FIG. 8, or by means of heavy metal staples 34, as shown in the drawings. With such bonding the enclosure can be opened only by destroying it, as must be done periodically for mechanical inspection of the meter. A new enclosure, however, is easily applied when inspection has been completed.

The main advantages of the present invention reside in the very simple form of the improved enclosure means whereby a complete tamper-proof housing is provided by a pair of molded half-sections or units which can be readily and permanently bonded together, on the job, to protect an installed or control valve. Whether bonding is done adhesively or by staples the assembly is accomplished quickly and cheaply and, since the molded half-sections are of extremely light weight and may be nested together, it is an easy matter for the meter inspector to have with him an ample supply of the units for replacement purposes. Other advantages reside in the fact that any attempt to tamper with the enclosed meter or protected device will be readily apparent to the inspector when he makes his rounds, thereby making prompt remedial action possible while the evidence of possible misuse is present.

Although but one specific embodiment of this invention is herein shown and described, it will be understood that details of the structure shown may be altered or omitted without departing from the spirit of the invention as defined by the following claims.

I claim:

1. A molded-plastic cavitied unit contoured and dimensioned to permit a pair thereof to be bonded together in face to face embracing relation in situ on a meter connected in line with a fluid conduit and including the inlet and outlet conduit connections therewith to enclose the same so as to preclude undetectable tampering therewith, wherein the plastic material is of a character known to have a natural tendency to register therein permanently and visually any strains applied to alter its embracive position on the meter.

2. A tamper-proof enclosure for flow meters and the inlet and outlet connections thereof comprising a hollow shell of molded plastic material having an internal cavity contour of substantially the shape of the external configuration of the meter and its coupling connections with inlet and outlet conduits, said shell including a pair of half-section units each molded to substantially the shape of the external contour of that portion of the meter and its connections with inlet and outlet conduits which extends from the respective side of a plane which divides the said meter along its central axis and which includes the axes of the said conduit connections, said half-section units being bonded together permanently in face-to-face meter embracing relation, and the said plastic material being of the kind which undergoes a permanent visually detectable molecular change at any point of physical stress.

References Cited

UNITED STATES PATENTS

| | | | |
|---|---|---|---|
| 578,775 | 3/1897 | Ringness | 73—201 X |
| 3,111,030 | 11/1963 | Whitman | 73—201 |
| 3,142,422 | 7/1964 | Mojonnier | 150—.5 X |
| 3,212,339 | 10/1965 | Olmedo | 73—431 |

RICHARD C. QUIESSER, *Primary Examiner.*

E. D. GILHOOLY, *Assistant Examiner.*

UNITED STATES PATENT OFFICE
CERTIFICATE OF CORRECTION

Patent No. 3,355,945                                December 5, 1967

Lee D. Perry

It is certified that error appears in the above identified patent and that said Letters Patent are hereby corrected as shown below:

In the heading to the printed specification, lines 3 and 4, for "Hoffman Estates, Ill., assignor to Robert B. Bishop Inc., Chicago, Ill., a corporation of Illinois" read -- 308 Bluebonnet Avenue, Hoffman Estates, Ill. 62250 --.

Signed and sealed this 15th day of July 1969.

(SEAL)
Attest:

Edward M. Fletcher, Jr.                       WILLIAM E. SCHUYLER, JR.
Attesting Officer                                Commissioner of Patents